United States Patent
Bremer et al.

(10) Patent No.: US 8,164,314 B2
(45) Date of Patent: Apr. 24, 2012

(54) DISTRIBUTED CAPACITOR BANK CONTROLLERS AND METHODS THEREOF

(75) Inventors: Daniel Bruce Bremer, Union, KY (US); Mark David Rucker, Walton, KY (US); James Edward Wilmoth, Stamping Ground, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 434 days.

(21) Appl. No.: 12/437,360

(22) Filed: May 7, 2009

(65) Prior Publication Data

US 2010/0283435 A1   Nov. 11, 2010

(51) Int. Cl.
 *G05F 3/00* (2006.01)
 *G05F 1/70* (2006.01)
 *G05F 5/00* (2006.01)
(52) U.S. Cl. .................. 323/211; 323/209; 323/210
(58) Field of Classification Search ........... 323/207–211
 See application file for complete search history.

(56) References Cited

U.S. PATENT DOCUMENTS

| | | | |
|---|---|---|---|
| 4,317,076 A | | 2/1982 | Price |
| 4,645,997 A | | 2/1987 | Whited |
| 4,891,569 A | * | 1/1990 | Light ............................ 323/210 |
| 5,670,864 A | | 9/1997 | Marx |
| 5,809,054 A | * | 9/1998 | Oelscher ....................... 373/104 |
| 6,008,548 A | * | 12/1999 | Fenner et al. .................. 307/105 |
| 6,114,841 A | * | 9/2000 | Hasler et al. ................... 323/210 |
| 6,590,493 B1 | * | 7/2003 | Rasimas et al. ........... 340/538.12 |
| 6,674,267 B2 | | 1/2004 | Wernersson |
| 6,700,358 B2 | | 3/2004 | McDaniel |
| 6,850,426 B2 | | 2/2005 | Kojori |
| 6,998,732 B2 | | 2/2006 | Xing |
| 7,002,321 B2 | | 2/2006 | McDaniel |
| 7,091,709 B2 | * | 8/2006 | Suzuki .......................... 323/274 |
| 7,490,306 B2 | | 2/2009 | Nguyen |
| 2004/0164718 A1 | * | 8/2004 | McDaniel et al. ............. 323/211 |
| 2008/0007230 A1 | * | 1/2008 | Kalyuzhny et al. ........... 323/205 |
| 2008/0106241 A1 | * | 5/2008 | Deaver et al. ................. 323/209 |
| 2008/0203979 A1 | | 8/2008 | Su |
| 2009/0033296 A1 | * | 2/2009 | Hammerstrom .............. 323/207 |

* cited by examiner

*Primary Examiner* — Jeffrey Sterrett
*Assistant Examiner* — Gary Nash
(74) *Attorney, Agent, or Firm* — Dinsmore & Shohl LLP

(57) ABSTRACT

A distributed capacitor bank controller for power factor correction of a power system may include a first distributed meter, a second distributed meter, a programmable logic controller and a communications pathway. The first and second meters may be operable to provide a power factor value, a current value, a voltage value, and a load value. The first and second meters may be coupled to the programmable logic controller via the communications pathway. The programmable logic controller may be operable to receive the power factor value, the current value, the voltage value and the load value from the first and second distributed meters, determine an average power factor value and a current unbalance value, and automatically add or remove a capacitor step of a capacitor bank to the power system based at least in part on the average power factor value, the current unbalance value, the voltage value and the load value.

19 Claims, 4 Drawing Sheets

DISTRIBUTED CAPACITOR BANK CONTROLLERS AND METHODS THEREOF

TECHNICAL FIELD

Embodiments described herein generally relate to power factor correction and, more particularly, to distributed capacitor bank controllers and methods for industrial power factor correction.

BACKGROUND

Power factor is generally known as the ratio of the real power (P) to the apparent power (S) flowing in a load. Real power is the capacity of the circuit for performing work while apparent power is the product of the current and voltage of the circuit. Industrial plants usually run at a naturally lagging or lower power factor (i.e., the load is inductive in nature). Leading or high power factor means the load is capacitive in nature, while unity power factor, a power factor of 1, is neither leading nor lagging and is the most efficient point for real power transmission. A load with a low power factor draws more current than a load with a power factor closer to 1 for the same amount of power transferred. In an industrial application, such as a factory, a low power factor results in higher amounts of energy lost in the system as well as increased monetary charges by electrical utility companies. Therefore, power factor correction is very important in industrial applications.

Power factor correction may be achieved by adding or removing reactor components such as capacitors or inductors to the power system. Adding capacitors or inductors to the system as needed may bring the power factor closer to 1. As indicated above, too little power factor correction can increase utility bills and cause low voltage problems. Too much correction can contribute to system instability and high voltages. However, present power factor correction systems are very expensive and require the use of specialty hardware including centralized and specialized monitoring systems and complicated control electronics.

Accordingly, a need exists for controllers and systems for power factor correction and monitoring in industrial power systems.

SUMMARY

In one embodiment, a distributed capacitor bank controller for power factor correction of a power system may include a first distributed meter, a second distributed meter, a programmable logic controller and a communications pathway. The first and second meters may be operable to provide a power factor value, a current value, a voltage value, and a load value. The first and second meters may be coupled to the programmable logic via the communications pathway. The programmable logic controller may be operable to receive the power factor value, the current value, the voltage value and the load value from the first and second distributed meters; determine an average power factor value and a current unbalance value; automatically add a capacitor step of a capacitor bank to the power system based at least in part on the average power factor value, the current unbalance value, the voltage value and the load value; and automatically remove a capacitor step of the capacitor bank from the power system based at least in part on the average power factor value, the current unbalance value, and the voltage value.

In another embodiment, a method of correcting the power factor of a power system may include obtaining a load value, a power factor value, a current value and a voltage value of the power system from a first and second distributed meter, determining an average power factor value over a sample period and a current unbalance value based on the current value, and adjusting the power factor of the power system by: automatically adding a capacitor step of a capacitor bank to the power system based at least in part on the average power factor value, the current unbalance value, the voltage value and the load value, or automatically removing a capacitor step of the capacitor bank from the power system based at least in part on the average power factor value, the current unbalance value and the voltage value.

In yet another embodiment, a method of correcting the power factor of an industrial power system may include obtaining a plurality of power system parameters from a first and second distributed meter, automatically adding a capacitor step of a capacitor bank to the power system based on the obtained power factor parameters, and automatically removing a capacitor step of the capacitor bank from the power system based on the obtained power factor parameters.

These and additional features provided by the embodiments will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 1:
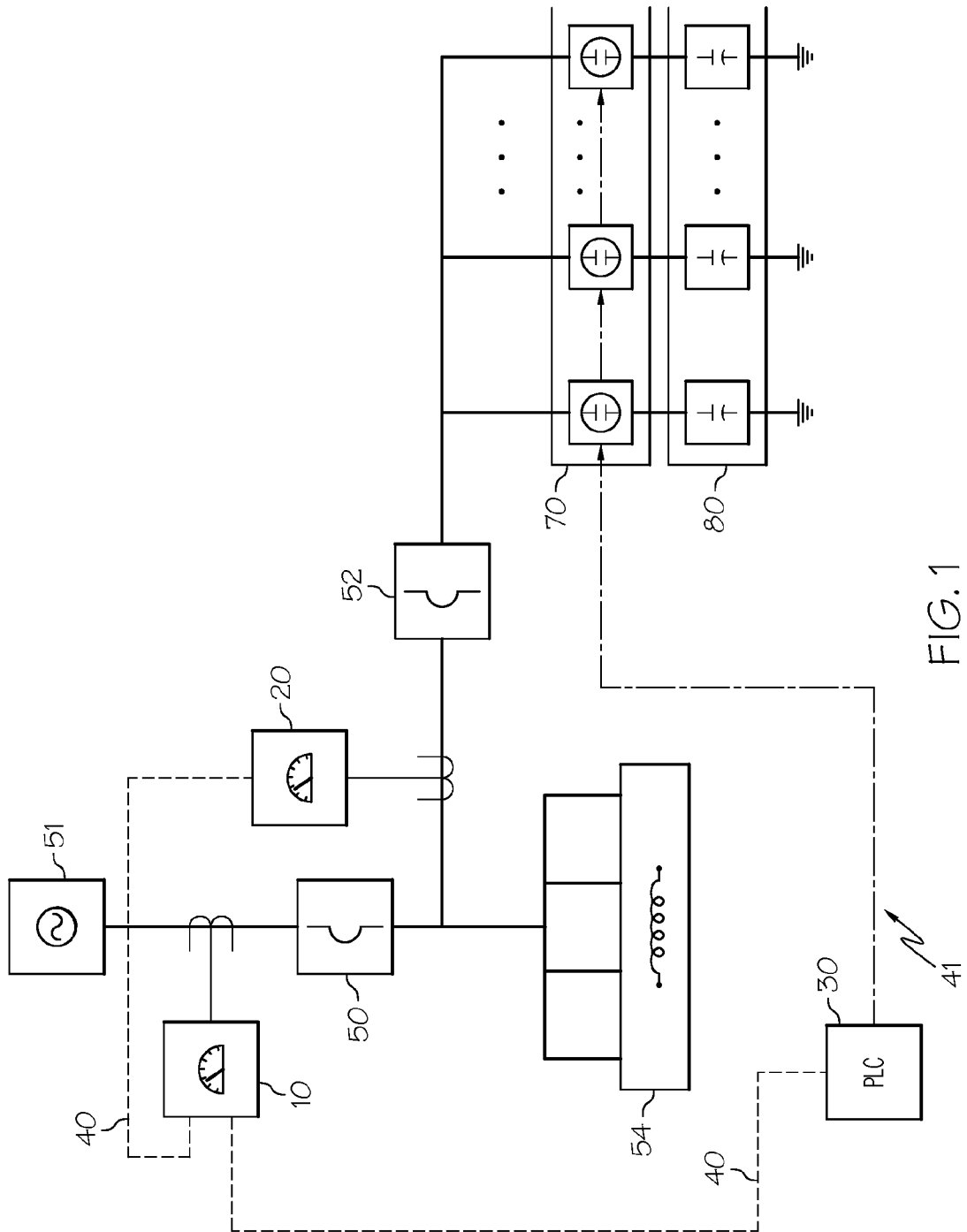
FIG. 1 is a schematic of an exemplary distributed capacitor bank controller and power factor correction system.

Referring to the drawings, embodiments are directed to systems and methods of automatically providing power factor correction in industrial applications by utilizing a distributed capacitor bank controller, thereby eliminating the need for an expensive dedicated power factor correction controller unit. Embodiments may make use of electrical components already available in the plant power system to sense and correct the power factor of the plant load rather than a dedicated power factor correction unit. As described in detail herein, the controller is programmed to add and remove capacitor steps of a capacitor bank to and from a power system depending on power system parameters provided by distributed meters. Additionally, the controller is programmed to detect and prevent power system faults such as voltage excursions and current unbalance scenarios based on the sensed power system parameters.

Figure 2:
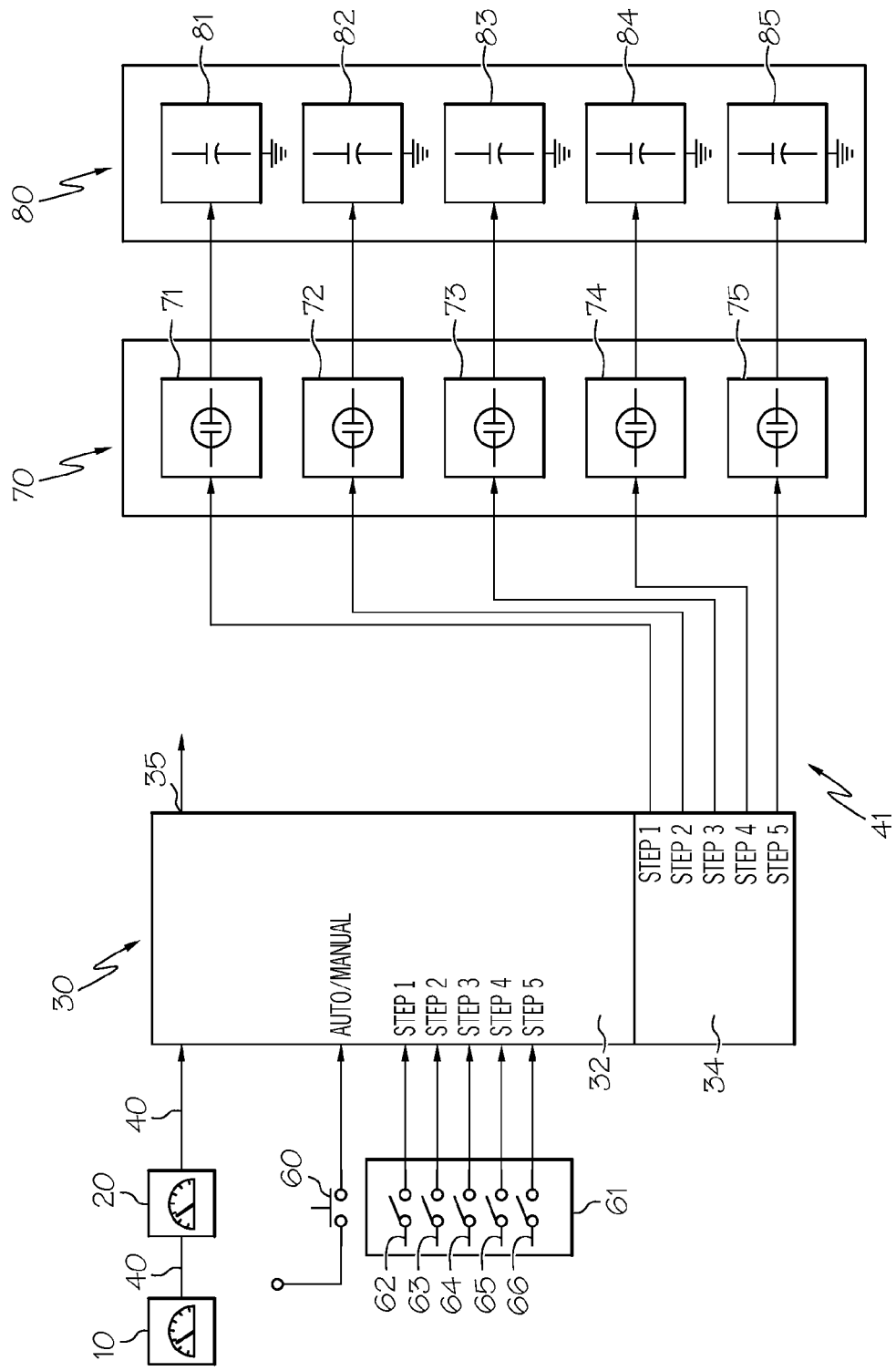
FIG. 2 is a schematic of an exemplary distributed capacitor bank controller and power factor correction system.

Referring now to FIGS. 1 and 2, an exemplary distributed capacitor bank controller and power factor correction system coupled to an industrial power system (e.g., utility source 51 and plant load 54) is illustrated. Although FIG. 1 illustrates only a single phase of the industrial power system for simplicity, the power system may be a three phase AC power system commonly utilized in manufacturing facilities. The exemplary capacitor bank controller comprises first and second distributed meters 10 and 20, a programmable logic controller ("PLC") 30, control hardware 70, and a communications pathway 40. The PLC 30 is coupled to a capacitor bank 80 having a plurality of capacitor steps 81-85 via control hardware 70, which may be configured as a plurality of switch assemblies 71-75 (FIG. 2) operable to switch the capacitor steps 81-85 (FIG. 2) of the capacitor bank 80 into and out of the power system in parallel with the plant load 55. The control hardware may be coupled to the PLC 30 by way of output wiring 41. In the illustrated embodiment, the capacitor bank 80 is electrically coupled to the source 51 via a capacitor breaker assembly 52 which is configured to disconnect the capacitor bank 80 from each phase of the industrial power system and a plant main breaker assembly 50 which is configured to disconnect the plant load 54 from each phase of the utility source 51. It will be understood that more than one plant main breaker 50 and/or more than one capacitor breaker 52 may be provided in the industrial power system, and may comprise meters having functionality similar to meters 10, 20. These plant main breakers 50 and capacitor breakers 52 may be individually operable to provide power system parameters to the PLC 30 or other devices to perform power factor correction as described herein.

As discussed, the capacitor bank 80 may comprise five capacitor steps 81-85 (FIG. 2). It will be understood that more or fewer capacitor steps may be provided in the capacitor bank. Each capacitor step may comprise one or more capacitors for each phase of the industrial power system. For example, a capacitor step may comprise two capacitors in parallel for each phase for a total of six capacitors per capacitor step. The capacitance of each capacitor and the arrangement of the capacitors within each capacitor step may be configured to provide a level of reactive power in accordance with the demands of the particular power system in which the controller is implemented. For example, the plant load and power system may necessitate each capacitor step to provide 2000 KVAR when added to the industrial power system. Further, each capacitor step may be configured to provide a desired percentage of voltage increase when added to the power system. The capacitors utilized in the capacitor bank 80 should be appropriately sized with respect to operating voltage.

Control hardware 70 may be electrically coupled to the capacitor bank 80 and operable to add and remove capacitor steps to and from the industrial power system. The control hardware 70 may comprise a plurality of switch assemblies 71-75 that may connect or disconnect the capacitor steps 81-85 to and from the plant source voltage. In one embodiment, each switch assembly 71-75 may comprise a single switch for each phase such that each switch assembly has three switches. The switches may be configured as vacuum contactors capable of switching high source voltages such as 13 kV, for example. In another embodiment, the switch assemblies 71-75 may comprise a main high-voltage vacuum contactor that is controlled by a lower voltage contact relay for each phase. As will be described herein, the switch assemblies 71-75 may be automatically controlled by outputs of the PLC 30 to add and remove capacitor steps 81-85 of the capacitor bank 80 when appropriate (FIG. 2). When the PLC 30 activates an output, the contact relays and vacuum contactors of the particular switch assembly may close to add the appropriate capacitor step to the industrial power system. Additionally, indicator lights may be provided to indicate which capacitor bank is presently activated.

The first and second distributed meters 10, 20 detect and/or calculate power system parameters such as plant power factor, current unbalance, voltage values, phase currents, plant load and harmonics. In other embodiments, the meters 10, 20 may be operable to only provide power readings (e.g., voltage and current) to the PLC 30 such that the PLC 30 may perform calculations such as power factor calculations. The meters 10, 20 may be any electronic meter or circuit monitor capable of sensing the power system parameters and providing output signals accordingly. The meters 10, 20 may be configured to communicate with remote devices such as the PLC 30 via the communication pathway 40, which may be configured as twisted pair wiring using open protocols (e.g., Modbus RTU) and/or Ethernet wiring using open protocols (e.g., Ethernet and Modbus/TCP). The communications pathway 40 may also be configured such that the meters 10, 20 communicate with the PLC 30 wirelessly.

The meters 10, 20 may be distributed throughout the power system so that meter 10 may monitor voltages, currents, harmonics, power factor and power flow through the main breaker assembly 50, and meter 20 may monitor voltages, currents, harmonics and power flow through the capacitor breaker 52. The meters 10, 20 may be distributed throughout the power system such that the first meter 10 is located prior to a plant main breaker 50 that is coupled to the power source 51 or anterior to the plant main breaker 50 but before connection to the plant load 54 or the capacitor breaker 52. The second meter 20 may be located after the capacitor breaker 52 and prior to the capacitor bank 80 or before the capacitor breaker 52 and the connection to other devices such as the plant load 53 or the plant main breaker 52.

Still referring to FIGS. 1 and 2, the PLC 30 may be a controller capable of communicating over the communications pathway 40 and may have an input module 32 and an output module 34. The PLC 30 may also comprise a communications output 35 (e.g., Ethernet output) that may communicate system status information (e.g., an alarm) to plant personnel. The PLC 30 may be configured to accept an "AUTO/MANUAL" input signal provided by a mode switch 60. The mode switch 60 may toggle the PLC 30 between automatic and manual override modes, wherein in automatic mode the PLC 30 utilizes the logic described below to automatically add and remove capacitor steps 81-85 and in manual mode capacitor steps 81-85 may be added manually or removed by operating an input device 62. The input device 62 may be configured as a plurality of control switches 62-66 or a human-machine interface ("HMI") (e.g., a touch screen and a controller) that provides control signals to the inputs of the PLC 30. The mode switch 60 may also be configured as part of the HMI rather than a physical switch. When in manual mode, the PLC 30 may be programmed to add and remove capacitor steps based on control signals provided by the input device 62. For example, if control switch 62 is activated, the PLC 30 will receive this signal at the STEP 1 input of the input module 32. The PLC 30 is programmed to then provide a STEP 1 output signal from the output module 34 to the control hardware 70 which then adds capacitor step 81 to the industrial power system via switch assembly 71.

The PLC 30 is programmed to receive the power system parameters from the first and second distributed meters 10, 20 to determine whether to take actions such as adding or subtracting a capacitor step or steps within the capacitor bank 80. The program software of the PLC 30 decides whether to add or remove a capacitor step based at least in part on the sampled or calculated power factor, current unbalance, load and voltage values obtained from the first and second meters 10, 20.

Figure 3A:
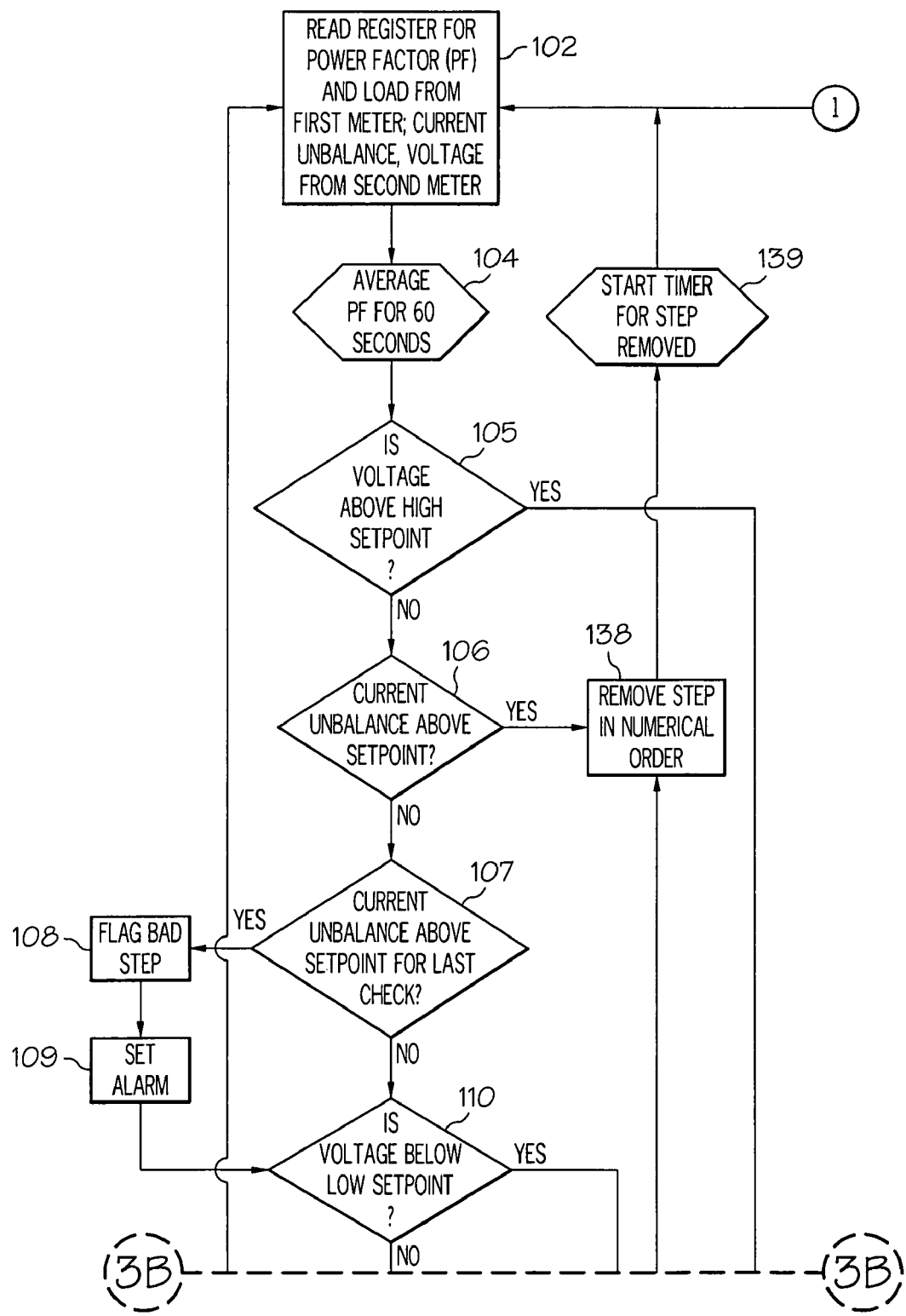
FIG. 3A is a section of a schematic flowchart illustrating exemplary distributed capacitor bank controller logic.
Figure 3B:
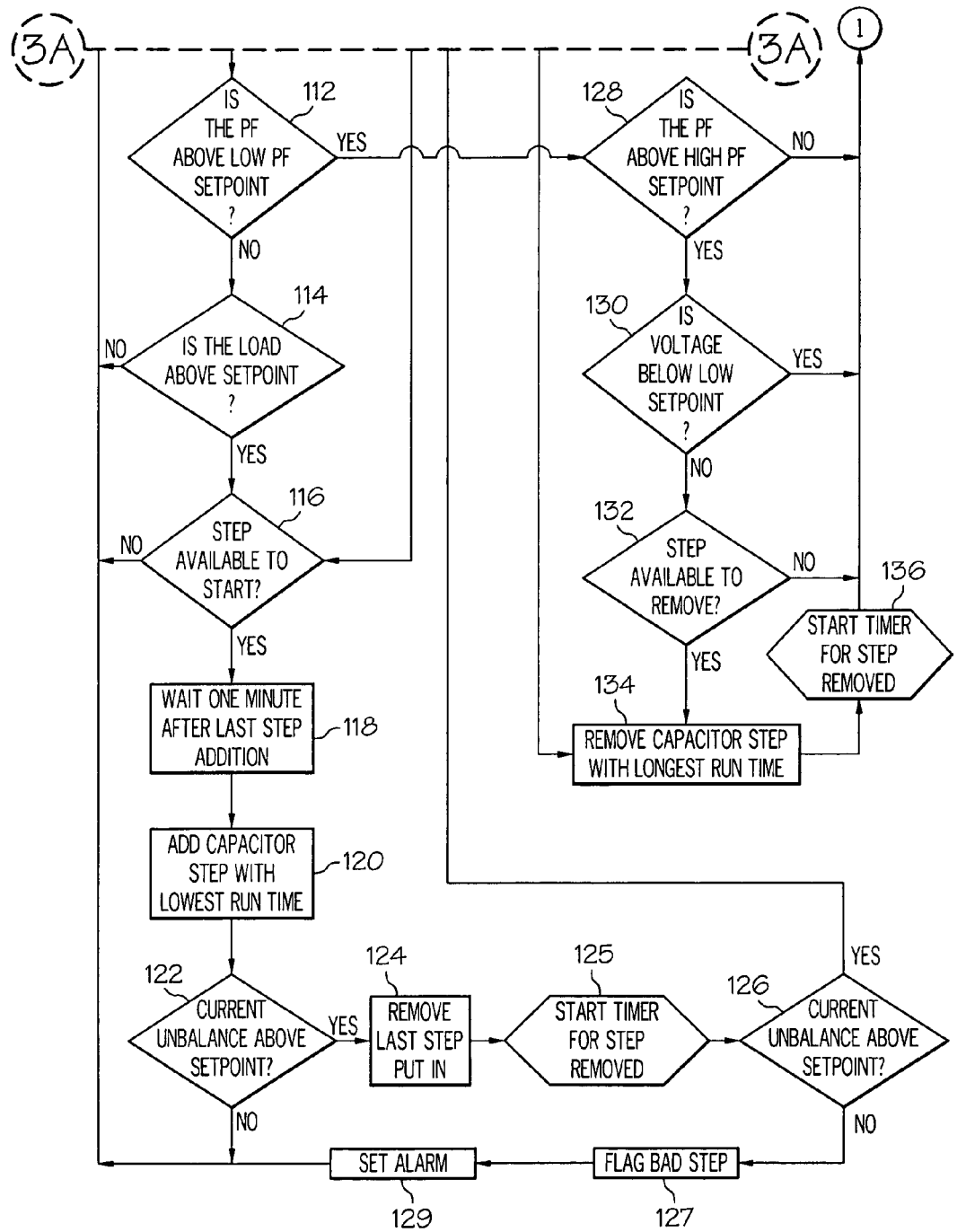
FIG. 3B is a section of a schematic flowchart illustrating exemplary distributed capacitor bank controller logic.

Referring now to FIGS. 3A and 3B, exemplary logic of the software that may be installed on the PLC 30 will be described. It will be understood that the flowchart of FIGS. 3A and 3B illustrates the logic of software running on a PLC 30 (or other like devices such as a personal computer) in one embodiment and that other embodiments may vary the order of the acts and/or not perform certain acts depicted in the flowchart to achieve ideal power factor values of the power system as well as protect the power system against failures. A capacitor step 81-85 may be added or removed from the industrial power system when certain conditions in the industrial power system exist. The conditions of the power system are determined by the power system parameters that are sensed and/or calculated by the distributed meters 10, 20. At Block 102, the PLC 30 obtains the power system parameters from the first and second meters 10, 20. In the illustrated embodiment, the first meter 10 calculates a power factor value based on sensed power system parameters such as voltage and current values. The PLC 30 then obtains the power factor value from the first meter 10 by reading the appropriate register. In other embodiments, the first meter 10 may provide voltage and current values directly to the PLC 30 which then calculates a power factor value based on the received voltage and current values. At Block 102 the PLC 30 also obtains a load value from the first meter and current unbalance and voltage values from the second meter 20. In other embodiments, the second meter 20 may provide a current value that comprises current amplitude and phase information to the PLC 30 such that the PLC 30 may calculate the current unbalance value. It will be understood that the first meter 10 may provide current unbalance and voltage values and the second meter 20 may provide power factor and load values, or any combination thereof.

At Block 104, the PLC 30 samples the power factor value over a sample period such as sixty seconds to calculate an average power factor value. Use of an average power factor value may prevent the PLC from reacting precipitously to transient power factor values due to instantaneous changes in the power factor of the industrial power system. It will be understood that sample periods other than 60 seconds in duration may be used.

After determining the average power factor, the PLC 30 of the illustrated embodiment compares the obtained voltage value with a high voltage set-point at Block 105. A high voltage set-point is selected and utilized so that the industrial power system does not enter an over voltage situation that may damage equipment that is connected to the power system. If the obtained voltage value is above the high voltage set-point, the PLC 30 removes a capacitor step at Block 134. Before removing the capacitor step, the PLC 30 may be programmed to determine if a capacitor step was recently removed and, if so, wait a period of time before removing the next capacitor step. This waiting period may allow the power system to adjust before removing the capacitor step. To help ensure that each capacitor step is activated for approximately the same amount of time, the capacitor step that is removed from the power system at Block 134 may be the capacitor step having the longest run time. However, the capacitor step that is removed does not have to be the capacitor step with the longest run time. After the capacitor step is removed from the power system, the PLC 30 may lock out the removed capacitor step for a lockout period by setting a timer that prevents the removed capacitor step from being added back into the system while the timer is active (Block 136). In the illustrated embodiment, the timer is set for five minutes. Durations other than five minutes may be utilized. The lockout period allows for the capacitors of the removed capacitor step to discharge prior to being added back into the power system.

Referring once again to Block 105, if the obtained voltage value is not above the high voltage set-point, the PLC 30 then compares the current unbalance value with a current unbalance set-point at Block 106. The current unbalance value may prevent the system from operating in a current unbalance scenario due to a failing capacitor step within the capacitor bank 80, and therefore prevent costly power system faults. The current unbalance set-point may be determined based on the attributes of the power system and may be, for example, 3% current unbalance. If the current unbalance value is above the current unbalance set-point, the PLC 30 removes a capacitor step from the power system at Block 138. In one embodiment, the PLC 30 may be configured to remove the capacitor step having the longest run time. As illustrated in the flowchart of FIG. 3A, after the capacitor step is removed in Block 138, the PLC reads the power system parameters at Block 102 and the above acts are repeated and capacitor steps may be removed in numerical order (i.e., in order of longest running to shortest running) until the current unbalance value is below the current unbalance set-point at Block 106.

After it is determined that the current unbalance value is below the current unbalance set-point, the PLC 30 may be programmed to determine whether the current unbalance value was above set-point for the last current unbalance test or check as illustrated in Block 107. If yes, then the recently removed capacitor step that caused the current unbalance value to fall below the current unbalance set-point may be flagged as a failing capacitor step at Block 108. An alarm may be set (Block 109) by turning on an indicator light that indicates a particular capacitor step is malfunctioning or by sending an error code over the communications pathway 40 that places plant personnel on notice that a failing capacitor step may be in need of maintenance.

In the exemplary logic illustrated in FIGS. 3A and 3B, after the PLC 30 determines that the current unbalance value is below the current unbalance set-point, the PLC 30 may then determine whether the obtained voltage value is below a low voltage set-point at Block 110. If the voltage value is below the low voltage set-point, the PLC 30 may try to raise the voltage level of the power system above set-point by adding a capacitor step at Block 120. The capacitor step may be added after verifying that there is a capacitor step available to start at Block 116, and after a period of time (e.g., one minute or other durations) following the addition of any previously added step to allow the power system to adjust (Block 118) and prevent the capacitor bank 80 from switching too frequently. The PLC 30 may be programmed to add the capacitor step having the shortest run-time to so that each capacitor step is in active service for approximately the same amount of time. Additional capacitor steps may be added to the power system until the voltage value is above the low voltage set-point.

If at Block 110 the voltage value is above the low voltage set-point, the PLC 30 may be programmed to evaluate the power factor of the industrial power system at Block 112. The PLC 30 compares the average power factor with a low power factor set-point. The low power factor set-point may be set based on the particular power system. For example, the low power factor set-point may be set at 0.90 lagging for a particular power system. If the average power factor is below the low power factor set-point, the PLC 30 may next evaluate the load of the power system to determine whether a capacitor step should be added. During times when the utility supplying the plant power does not charge high fees associated with low power factor, such as during the night and on weekends, power factor may not be a concern for the manufacturing plant. Therefore, to prevent undue wear on the components of the power factor correction system, such as the capacitors of the capacitor steps 81-85 and switch assemblies 71-75, the load set-point may be dynamically adjusted based on the utility's fee schedule (e.g., day and time) such that capacitor steps are not unnecessarily added to the power system when power factor is not a concern for particular load values.

If the load value is above the load set-point at Block 114, the PLC 30 may determine whether there are any capacitor steps available to be added at Block 116 and, if so, wait a period of time (e.g., one minute) at Block 118 after the addition of any previously added step to allow the power system to adjust, and then add a capacitor step to the power system at Block 120. If the load is below the load set-point, the PLC 30 may return to Block 102 and again read the power system parameters from the first and second meters. After a capacitor step has been added at Block 120, the PLC 30 may read and determine an updated current unbalance from the second meter 20 and determine if the updated current unbalance value is above the current unbalance set-point at Block 122. If the updated current unbalance value is not above the current unbalance set-point, the PLC 30 may return to Block 102. However, if the addition of the capacitor step at Block 120 has caused the updated current unbalance value to be above the current unbalance set-point, the PLC 30 may remove the recently added step at Block 124, set the timer for the removed capacitor step at Block 125, and once again obtain an updated current unbalance value at Block 126. If the updated current unbalance value is below the set-point, then the recently removed capacitor step may be flagged as malfunctioning (Block 127) and an alarm may be set (Block 129). By removing capacitor steps that cause current unbalance in the power system, future faults may be prevented. If the updated current unbalance at Block 126 is still above the current unbalance set-point, additional capacitor steps may be removed until the current unbalance is below the set-point (Block 128) as described above and illustrated in the flow chart of FIGS. 3A and 3B.

Referring once again to Block 112, if the average power factor is above the low set-point, the PLC 30 may be programmed to compare the average power factor with a high power factor set-point at Block 128. The PLC 30 may be programmed to keep the power factor of the industrial power system within a range of power factor values bound by the low and high power factor set-points. The high power factor set-point may be determined by the demands of the industrial power system and the utility, and may be a value close to 1 (e.g., 0.95 leading). In the illustrated embodiment of FIGS. 3A and 3B, if the average power factor is below the high power factor set-point, then the PLC 30 may again read the voltage value and compare it to the low voltage set-point. If the voltage value is above the low voltage set-point, the PLC 30 may remove a capacitor step from the power system at Block 134, which may be the capacitor step having the longest run time. The lockout timer may be initiated for the removed capacitor step at Block 136 and the PLC 30 may return to Block 102. If the voltage value is below the low voltage set-point, then the PLC 30 may return to Block 102 because the removal of a capacitor step may further lower the voltage of the power system. In other embodiments, the PLC 30 may not check the voltage value at Block 130 but rather remove a capacitor step (Block 134) once it is determined that the power factor is above the high power factor set-point. By removing capacitor steps when the power factor is above a high power factor set-point, the distributed capacitor bank controller may reduce the overall run-time of the capacitors within the capacitor bank 80. Other embodiments may not compare the average power factor value with a high power factor set-point and instead take no action if the average power factor value is above the low power factor set-point.

Embodiments described and illustrated herein may enable the power factor of an industrial power system to be maintained within an ideal range while also protecting the power system from current unbalance, over-voltage and under-voltage scenarios. Some embodiments of the present disclosure may correct power factor and protect against power system faults using components already available in an industrial facility, and may provide for simple adjustments to the various set-point to enable the distributed capacitor bank controller to operate in a wide variety of power systems and power system operating conditions.

For the purposes of describing and defining the present invention it is noted that the term "approximately," when utilized herein, represents the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

It is noted that recitations herein of a component of the present invention being "configured," "operable" or "programmed" in a particular way, "configured," "operable" or "programmed" to embody a particular property, or function in a particular manner, are structural recitations as opposed to recitations of intended use. More specifically, the references herein to the manner in which a component is "configured," "operable" or "programmed" denotes an existing physical condition of the component and, as such, is to be taken as a definite recitation of the structural characteristics of the component.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A distributed capacitor bank controller for power factor correction of a power system, the distributed capacitor bank controller comprising a first distributed meter, a second distributed meter, a programmable logic controller and a communications pathway, wherein:

the first and second distributed meters are operable to provide a power factor value, a current value, a voltage value, and a load value;

the communications pathway couples the first and second distributed meters to the programmable logic controller; and the programmable logic controller is operable to:
receive the power factor value, the current value, the voltage value and the load value from the first and second distributed meters;
determine an average power factor value and a current unbalance value;
automatically add a capacitor step of a capacitor bank to the power system when:
the voltage value is below a high voltage set-point, the current unbalance value is below a current unbalance set-point, and the voltage value is below a low voltage set-point; or
the voltage value is above the low voltage set-point, the average power factor value is below a low power factor set-point, and the load value is above a load set-point; and
automatically remove a capacitor step of the capacitor bank from the power system when:
the voltage value is above the high voltage set-point;
the current unbalance value is above the current unbalance set-point; or
the voltage value is above the low voltage set-point and the average power factor value is above the low power factor set-point and above a high power factor set-point.

2. The distributed capacitor bank controller of claim 1 wherein the average power factor value is based upon a plurality of power factor values received over a sample period, and the current unbalance value is based upon the current value.

3. The distributed capacitor bank controller of claim 1 wherein the programmable logic controller is further operable to:
determine an updated current unbalance value by obtaining an updated current value after a capacitor step is added; and
remove a last capacitor step added to the power system if the updated current unbalance value is above the current unbalance set-point.

4. The distributed capacitor bank controller of claim 3 wherein the programmable logic controller is further operable to remove capacitor steps in numerical order of longest running time to shortest running time and determine an updated current unbalance value after each capacitor step is removed until the updated current unbalance value is below the current unbalance set-point.

5. The distributed capacitor bank controller of claim 1 wherein the programmable logic controller is operable to dynamically adjust a load set-point depending at least in part on a day and a time.

6. The distributed capacitor bank controller of claim 1 wherein the programmable logic controller comprises a manual override mode operable to enable manual addition or removal of capacitor steps to and from the power system.

7. The distributed capacitor bank controller of claim 1 wherein the first distributed meter is located within the power system prior to a plant main breaker and the second distributed meter is located within the power system after a capacitor breaker and prior to the capacitor bank.

8. A method of correcting a power factor of a power system comprising:
obtaining a load value, a power factor value, a current value and a voltage value of the power system from a first and second distributed meter;
determining an average power factor value over a sample period and a current unbalance value based on the current value; and
adjusting the power factor of the power system by:
automatically adding a capacitor step of a capacitor bank to the power system when:
the voltage value is below a high voltage set-point, the current unbalance value is below a current unbalance set-point, and the voltage value is below a low voltage set-point; or
the voltage value is above the low voltage set-point, the average power factor value is below a low power factor set-point, and the load value is above a load set-point; or
automatically removing a capacitor step of the capacitor bank from the power system when:
the voltage value is above a high voltage set-point; or
the current unbalance value is above a current unbalance set-point; or
the voltage value is above a low voltage set-point, and the average power factor value is above a low power factor set-point and above a high power factor set-point.

9. The method of claim 8 wherein the method further comprises determining an updated current unbalance value by obtaining an updated current value after a capacitor step is added.

10. The method of claim 9 wherein the method further comprises removing a last capacitor step added if the updated current unbalance value is above a current unbalance set-point.

11. The method of claim 10 wherein the updated current unbalance value is determined after a system adjustment period that begins at the time the capacitor step was added.

12. The method of claim 11 wherein the method further comprises removing capacitor steps in numerical order of longest running time to shortest running time and calculating an updated current unbalance value after each capacitor step is removed until the updated current unbalance value is below the current unbalance set-point.

13. The method of claim 8 wherein the method further comprises dynamically adjusting a load set-point based at least in part on a day and a time.

14. A method of correcting a power factor of an industrial power system comprising:
obtaining a plurality of power system parameters from a first and second distributed meter;
automatically adding a capacitor step of a capacitor bank to the power system based on the obtained plurality of power factor parameters and a load set-point, wherein the load set-point is dynamically based on a day and a time; and
automatically removing a capacitor step of the capacitor bank from the power system based on the obtained plurality of power factor parameters and the load-set-point.

15. The method of claim 14 wherein:
the plurality of power system parameters comprises a load value, a power factor value, a current value and a voltage value; and
the method further comprises determining an average power factor value over a sample period and a current unbalance value based on the current value.

16. The method of claim 15 wherein:
automatically adding a capacitor step further comprises adding a capacitor step of the capacitor bank to the power system when:
the voltage value is below a high voltage set-point, the current unbalance value is below a current unbalance set-point, and the voltage value is below a low voltage set-point; or
the voltage value is above the low voltage set-point, the average power factor value is below a low power factor set-point, and the load value is above the load set-point; and
automatically removing a capacitor step further comprises removing a capacitor step of the capacitor bank from the power system when:
the voltage value is above the high voltage set-point;
the current unbalance value is above the current unbalance set-point; or
the voltage value is above the low voltage set-point and the average power factor value is above the low power factor set-point and above a high power factor set-point.

17. The method of claim 16 wherein the method further comprises:
determining an updated current unbalance value by obtaining an updated current value after a capacitor step is added; and
removing a last capacitor step added to the power system if the updated current unbalance value is above the current unbalance set-point.

18. The method of claim 17 wherein the updated current unbalance value is determined after a system adjustment period that begins at the time the capacitor step was added.

19. The method of claim 14 wherein the method further comprises removing capacitor steps in numerical order of longest running time to shortest running.

* * * * *

UNITED STATES PATENT AND TRADEMARK OFFICE
CERTIFICATE OF CORRECTION

PATENT NO. : 8,164,314 B2
APPLICATION NO. : 12/437360
DATED : April 24, 2012
INVENTOR(S) : Daniel Bruce Bremer et al.

Page 1 of 1

It is certified that error appears in the above-identified patent and that said Letters Patent is hereby corrected as shown below:

In the Specification

Column 2, line 18, change "obtained power factor parameters," to
-- obtained plurality of power system parameters, --

Column 2, line 20, change "obtained power factor parameters." to
-- obtained plurality of power system parameters. --

In the Claims

Claim 14, column 10, lines 18-19, change "obtained plurality of power factor parameters" to
-- obtained plurality of power system parameters --

Claim 14, column 10, lines 23-24, change "obtained plurality of power factor parameters" to
-- obtained plurality of power system parameters --

Signed and Sealed this
Fifteenth Day of September, 2015

Michelle K. Lee
*Director of the United States Patent and Trademark Office*